United States Patent
Young

(10) Patent No.: US 7,792,634 B2
(45) Date of Patent: Sep. 7, 2010

(54) FLIGHT INFORMATION REMINDER SYSTEM AND METHOD

(76) Inventor: Bryan Garrett Young, 11011 N. 92nd St., Unit #1128, Scottsdale, AZ (US) 85260

( * ) Notice: Subject to any disclaimer, the term of this patent is extended or adjusted under 35 U.S.C. 154(b) by 840 days.

(21) Appl. No.: 11/688,528

(22) Filed: Mar. 20, 2007

(65) Prior Publication Data

US 2008/0234923 A1    Sep. 25, 2008

(51) Int. Cl.
*G06F 19/00* (2006.01)

(52) U.S. Cl. .................................... 701/120; 455/414.2

(58) Field of Classification Search ........................ None
See application file for complete search history.

(56) References Cited

U.S. PATENT DOCUMENTS

| | | | | |
|---|---|---|---|---|
| 5,966,068 | A * | 10/1999 | Wicks et al. | 340/286.01 |
| 6,040,781 | A * | 3/2000 | Murray | 340/825.22 |
| 7,119,716 | B2 | 10/2006 | Horstemeyer | |
| 7,603,281 | B1 * | 10/2009 | Miller et al. | 705/1.1 |
| 2003/0233244 | A1 * | 12/2003 | Kumhyr | 705/1 |

* cited by examiner

*Primary Examiner*—Michael J. Zanelli
(74) *Attorney, Agent, or Firm*—Parsons & Goltry; Michael W. Goltry; Robert A. Parsons

(57) ABSTRACT

A flight information reminder system includes a computer system maintaining updated flight information about a flight having a duration. The computer system is adapted to issue messages to individual subscriber units over a wireless network at spaced intervals throughout at least a portion of the duration of the flight, and the subscriber units are each coupled to receive the messages issued from the computer system over the wireless network. The messages each contain the updated flight information about the flight.

26 Claims, 1 Drawing Sheet

FLIGHT INFORMATION REMINDER SYSTEM AND METHOD

FIELD OF THE INVENTION

The present invention relates to systems and methods for communicating flight departure and arrival information to others.

BACKGROUND OF THE INVENTION

The first airline was established in 1918 in Germany shortly after the development of the first practical passenger planes. Most of the airlines founded in the 1920s and '30s were created at least in part to encourage the purchase of aircraft of domestic manufacture, the need to provide colonial routes of travel between the extensive colonial empires then in existence, the desire to establish world-scale route patterns, and the desire after World War I for an air service to speed up the mails. Competition for airmail routes led to the formation of several large American aviation companies.

Modern airline travel is the principle means of travel throughout the world today. Improved aircraft operation, the advent of multi-engine aircraft and the jet engine, and improved passenger accommodations all contribute to the overwhelming popularity of air travel. To participate in modern airline travel, passengers must purchase flight reservations in advance. Flight reservations can be purchased in person or by phone, but are most commonly purchased through online purchasing sources utilizing the World Wide Web or other Internet.

Passengers of airline flights must be keenly aware of their flight information, including airline names of flight numbers, departure locations and departure times, destination locations and arrival times, and other relevant flight information. Flight information is often provided to passengers in the form of itineraries provided by the airline. In other instances, it is well known for passengers keep track of their relevant flight information by documenting the flight information in a day-timer, a travel journal, a portable electronic device such as portable digital assistant or laptop computer or the like, etc. Regardless of the means utilized by passengers to document their flight information to ensure they arrive at the correct departure locations in advance of their departure times and also inform others of their arrival destinations and times and flight numbers and the like, many passengers routinely loose their flight itineraries, misplace their previously flight information, or simply forget the details concerning their flights, which often leads to missed flights, and confusion for others that have planned to pick up passengers at their travel destinations.

SUMMARY OF THE INVENTION

Accordingly, it is an object of the present invention to provide a reliable system and method which provides passengers and others with updated flight information and flight status about flights, which keeps passengers and others informed of departing and arriving flights, which reduces or eliminates unnecessary travel to and from airports, which reduces needlessly-incurred parking fees and other travel fees relating to unnecessary travel to and from airports, which reduces unnecessary vehicle traffic at airports, which reduces the number of telephone calls made to airline service providers requesting flight status information, which helps develop goodwill and increased communication between airline service providers and passengers, and which ensures that scheduled passengers are not forgotten by airline service providers.

According to the principle of the invention, a flight information reminder method includes providing a computer system maintaining updated flight information about a flight having a duration, and which is adapted to issue messages to an individual subscriber unit over a wireless network, and the computer system issuing messages to the wireless individual subscriber unit at spaced intervals throughout at least a portion of the duration of the flight, the messages each containing the updated flight information about the flight. The messages each consist of an automated voice message, a text message, an email message or other form of electronic message. The updated flight information consists of an updated departure time of the flight, an updated arrival time of the flight, an updated flight status, or other information relating to the flight including, as a matter of example, the name of the airline, the flight number, the flight departure location, the flight arrival destination, etc. The duration of the flight extends from approximately an establishment of the flight to approximately a departure time of the flight. In another embodiment, the duration of the flight extends from approximately an establishment of the flight to approximately an arrival time of the flight. In yet a further embodiment, the duration of the flight extends from approximately a starting time leading up to a departure time of the flight to approximately an arrival time of the flight. In yet still a further embodiment, the duration of the flight extends from approximately a starting time leading up to a departure time of the flight to approximately the departure time of the flight. In one embodiment, the wireless network is a wireless telephonic network. In another embodiment, the wireless network is a wireless computer network.

According to the principle of the invention, a flight information reminder method includes providing a flight having a duration, providing a passenger assigned to the flight and to an individual subscriber unit, providing a computer system maintaining updated flight information about the flight, and which is adapted to issue messages to the individual subscriber unit over a wireless network, and the computer system issuing messages to the individual subscriber unit over the wireless network at spaced intervals throughout at least a portion of the duration of the flight, the messages each containing the updated flight information about the flight. In a particular embodiment, the method further specifies a personal message to the passenger maintained by the computer system, and the computer system including the personal message in at least one of the messages. In yet another embodiment, the method additionally includes a personal message to the passenger from a third party maintained by the computer system, and the computer system including the personal message from the third party in at least one of the messages. The messages each consist of an automated voice message, a text message, an email message or other form of electronic message. The updated flight information consists of an updated departure time of the flight, an updated arrival time of the flight, an updated flight status, or other information relating to the flight including, as a matter of example, the name of the airline, the flight number, the flight departure location, the flight arrival destination, etc. In one embodiment, the duration of the flight extends from approximately an establishment of the flight to approximately a departure time of the flight. In another embodiment, the duration of the flight extends from approximately an establishment of the flight to approximately an arrival time of the flight. In a further embodiment, the duration of the flight extends from approximately a starting time leading up to a departure time of the flight to approximately the departure time of the flight. In yet still a further embodiment, the duration of the flight extends from approximately a starting time leading up to a departure time of the flight to approximately an arrival time of the flight. In one embodiment, the wireless network is a wireless telephonic network. In another embodiment, the wireless network is a wireless computer network.

According to the principle of the invention, a flight information reminder system includes a computer system maintaining updated flight information about a flight having a duration, and which is adapted to issue messages to individual subscriber units over a wireless network at spaced intervals throughout at least a portion of the duration of the flight, and the messages each containing the updated flight information about the flight. The messages each consist of an automated voice message, a text message, an email message or other form of electronic message. The updated flight information consists of an updated departure time of the flight, an updated arrival time of the flight, an updated flight status, or other information relating to the flight including, as a matter of example, the name of the airline, the flight number, the flight departure location, the flight arrival destination, etc. In one embodiment, the duration of the flight extends from approximately an establishment of the flight to approximately a departure time of the flight. In another embodiment, the duration of the flight extends from approximately an establishment of the flight to approximately an arrival time of the flight. In a further embodiment, the duration of the flight extends from approximately a starting time leading up to a departure time of the flight to approximately the departure time of the flight. In yet still a further embodiment, the duration of the flight extends from approximately a starting time leading up to a departure time of the flight to approximately an arrival time of the flight. In one embodiment, the wireless network is a wireless telephonic network. In another embodiment, the wireless network is a wireless computer network.

Consistent with the foregoing summary of preferred embodiments, and the ensuing detailed description, which are to be taken together, the invention also contemplates associated flight information reminder system and method embodiments.

BRIEF DESCRIPTION OF THE DRAWINGS

Referring to the drawing.

DETAILED DESCRIPTION OF A PREFERRED EMBODIMENT

Figure 1:
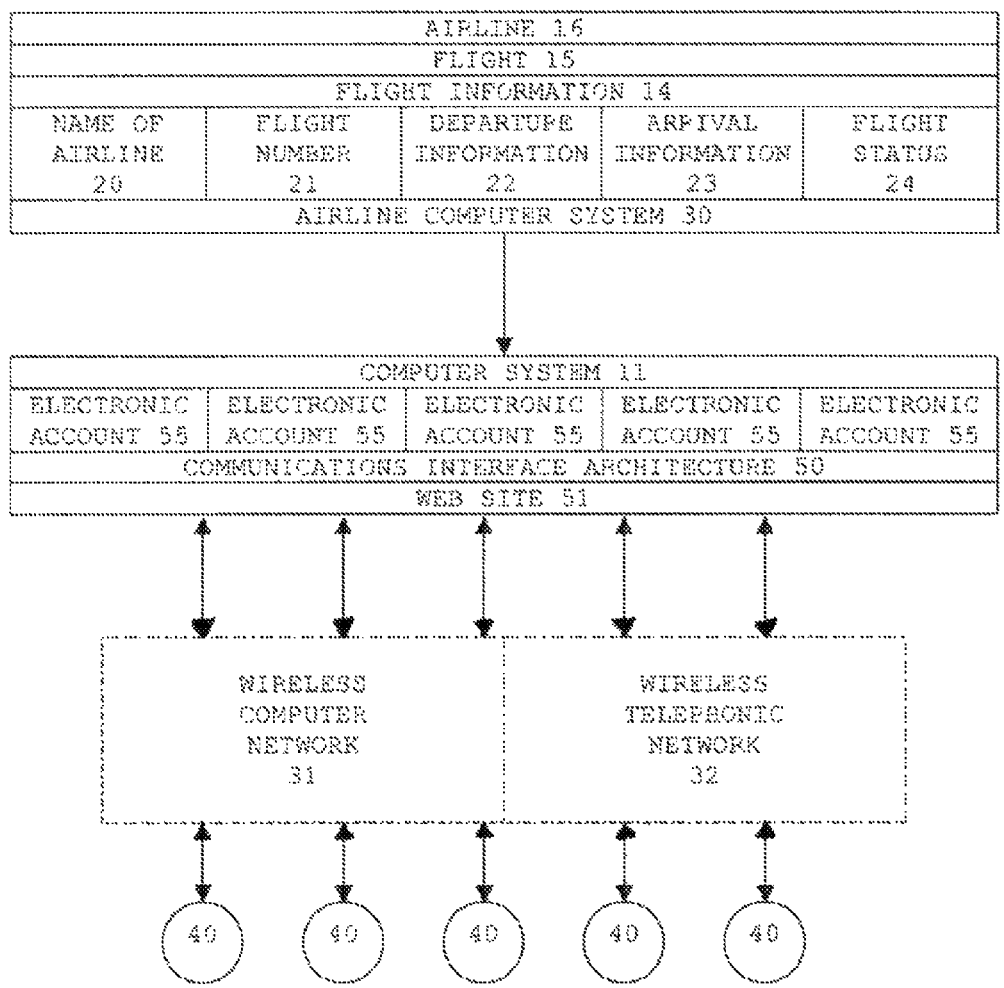
FIG. 1 is a highly generalized schematic representation of a flight information reminder system constructed and arranged in accordance with the principle of the invention.

Turning now to the drawing, in which like reference characters indicate corresponding elements through the view, attention is directed to FIG. 1 in which there is seen a schematic representation of a flight information reminder system 10 for communicating flight information constructed and arranged in accordance with the principle of the invention including a computer system 11 receiving and maintaining flight information 14 about a flight 15 serviced by an airline 16. Airline 16 consists of an air transportation system including its equipment and aircraft, routes, operating personnel, and management, whereby the transporting portion of a flight is a trip made by an aircraft transporting passengers between a point of departure and a point of arrival.

Flight information 14 consists of, for instance, a name 20 of airline 16, a flight number 21 assigned to flight 15, departure information 22 of flight 15 including, for instance, the departure time and the names of the city and the airport and also the airport gate from which flight 15 is scheduled to depart, arrival information 23 of flight 15 including, for instance, the arrival time and the name of the city and the airport and the airport gate to which flight 15 is scheduled to arrive, and flight status 24 of flight 15, e.g., whether flight 15 is prepared for departure, departing, prepared for arrival, arriving, on-time, delayed, canceled, etc., including any additional information relating to flight 15 including route changes, airport closures, flight number changes, etc. Flight information 14 is input into and maintained by an airline computer system 30, maintained by airline 16, in a conventional and well-known manner and in accordance with conventional flight scheduling and managing practice, further details of which are well-known in the art and will readily occur to those having regard for the art. Computer system 30 is conventional and well-known, and maintains flight information 14 in a conventional and well-known manner and does not comprise part of the invention.

Individual subscriber units 40 are each assigned to or otherwise belong to passengers assigned to flight 15. Individual subscriber units 40 may be supplied to passengers assigned to flight 15, such as by airline 16 or a third party service provider, or may be provided or otherwise owned by the passengers. Individual subscriber units 40 each consist wireless communications device capable of communicating through wireless networks, such as a wireless computer network or Internet, and a wireless telephonic network or cellular network. Individual subscriber units 40 may each include, for instance, a cellular phone or other cellular device, a personal digital assistant, a Blackberry® brand communications device, a pager, a computer, a laptop computer, or other form of conventional or readily-available wireless communications device structured to communicate through a wireless computer network, such as wireless computer network 31, and also a wireless telephonic network, such as wireless telephonic network 32. Each individual subscriber units 40 is assigned an address that is used by others to communicate with that individual subscriber unit, such as a telephone number used by others to issue calls to that individual subscriber unit, such as voice calls, text message calls or simply text messages, or an email address used by others to issue emails to that individual subscriber unit 40. In FIG. 1, five individual subscriber units 40 are illustrated simply as a matter of example indicating five corresponding passengers assigned to flight 15. Any number of passengers may be assigned to flight 15 depending on the capacity of the aircraft selected to service flight 15. Furthermore, the teachings of the invention are identical for each of the individual subscriber units 40, and apply equally to each individual subscriber unit 40.

Passengers are assigned to flight 15, normally after having made reservations for flight 15 in accordance with the reservation policies and procedures established by airline 16 and in a conventional and well-known manner, such as with a travel agent, through an online flight reservation system such as travelocity.com, expedia.com, or the like, or by communicating directly with airline 16 whether in person, by phone, or online utilizing a flight reservation web site offered and maintained by airline 16. In making reservations, passengers will typically be required to provide required personal information in accordance with conventional practice. Passenger reservations are maintained by airline 16 in any conventional and well-known manner, such as by airline computer system 30 or other computer system.

Computer system 11 is coupled in data communication with airline computer system 30 to receive flight information 14 from airline computer system 30. Computer system 11 incorporates conventional storage and hardware and software elements for proper and intended operation and data storage or maintenance, and is coupled to receive and maintain flight information 14 from airline computer system 13 in a conventional and well-known manner. Computer system 11 and airline computer system 30 can be maintained at the same location, or different locations. Computer system 11 incorporates a conventional communications interface architecture 50 that is operated by, or otherwise utilized by or associated with, computer system 11 to receive or otherwise access flight information 14 maintained by computer system 11, and issue messages containing flight information 14 to individual subscriber units 40 over networks 31 and 32 at spaced intervals throughout the duration of flight 15, or at least a portion of the duration of flight 15, for keeping passengers assigned to individual subscriber units 40 apprised of flight information 14 through individual subscriber units 40, in accordance with the principle of the invention, which helps prevent passengers from missing their flights and ensures passengers are made aware of any changes to their flights.

Messages are issued from architecture 50 at spaced intervals, such as ten minute spaced intervals, thirty minute spaced intervals, one hour spaced intervals, two hour spaced intervals, six hour spaced intervals, twelve hour spaced intervals, etc. The spaced intervals between messages can be the same or different, and can actually increase in rate leading up to the scheduled departure time of flight 15, if desired. Passengers may specify the timing of receiving messages, if desired. In a particular embodiment, messages may be issued from architecture 50 each time updated flight information is received by computer system 11 from airline computer system 30. Because flight information 14 maintained by computer system 11 is updated and thereby maintained current and accurate, flight information 14 contained in the messages sent to individual subscriber units 40 from architecture 50 is also updated or otherwise current and accurate.

Each of the messages includes a voice message, a text message, an email message, or other form of electronic message communicating the updated flight information 14 from computer system 11. In this regard, architecture 50 may be configured conventionally with an automated voice messaging system for issuing automated voice messages communicating the updated flight information 14, may be configured with a conventional automated text messaging system for issuing text messages communicating the updated flight information, and may also be configured with a conventional automated email system for issuing emails containing the updated flight information. As it relates to each passenger assigned to flight 15, the flight information 14 communicated in the messages may additionally include the name of the passenger, a confirmation code for the passenger confirming that the passenger is assigned to flight 15, or other information that may be useful to passenger, including an advertisement or other selected message.

Computer system 11 is provided with and maintains the addresses of individual subscriber units 40 assigned to the passengers who are, in turn, assigned to flight 15. The addresses of individual subscriber units 40 are provided to computer system 11 from airline computer system 30 or other computer or computer system, from individual subscriber units 40 communicating with computer system 11 through network 31 or network 32, through a web site 51 accessed by the passengers by other computers or networked device and which is associated with computer system 11 and which is accessible over wireless computer network 31 or other computer network or Internet, through the passengers' use of an automated telephonic registration or login system associated with computer system 11 and which is accessible telephonically by passengers over wireless telephonic network 32 or other telephonic network associated with computer system 11, etc. Each passenger may provide the address to his or her individual subscriber unit 40 at the time of making his or her reservation for flight 15, or at a later time as may be desired.

The addresses to individual subscriber units 40 are each maintained in an electronic account 55, such as an electronic file, document, record, or the like, maintained by computer system 11, in accordance with the principle of the invention. The addresses maintained in electronic documents 55 are linked to flight number 21 or other identifier identifying flight 15 thereby ensuring that flight information 14 relating to flight 15 is contained in the messages sent to individual subscriber units 40 from architecture 50 of computer system 11, and not the flight information from a different flight.

Flight 15 has a duration. The duration of flight 15 according to this disclosure is not defined as just the actual transportation portion or travel duration of flight 15 from the scheduled departure time to the scheduled arrival time. Rather, the duration of flight 15 can include not only the actual transportation portion or travel duration of flight 15 from the scheduled departure time to the scheduled arrival time, or otherwise from the departure time to the arrive time, but also may include a preflight duration of flight 15 from the establishment of flight 15, or perhaps at some point after the establishment of flight 15 prior to the scheduled departure time of flight 15, to the scheduled departure time or otherwise the departure time of flight 15. For instance, the duration of flight 15 can extend from the establishment of flight 15 by airline 16, through the scheduled departure time of flight 15 and through the scheduled travel duration of flight 15 and ultimately to the scheduled arrival time of flight 15. The defined duration of flight can consist any selected duration of time extending from the establishment of flight 15 to the scheduled arrival time of flight. As a matter of example, in one embodiment the duration of flight 15 extends from approximately the establishment of flight 15 to approximately the scheduled departure time of flight 15, in which the establishment of flight 15 consists of the approximate time that airline 16 offers flight 15 to customers for booking reservations. In another example according to another embodiment, the duration of flight 15 extends from approximately the establishment of flight 15 to approximately the scheduled arrival time of flight 15. In yet another example according to yet another embodiment, the duration of flight 15 extends from approximately a predetermined starting time leading up to the scheduled departure time of flight 15 to approximately the scheduled arrival time of the flight, in which the starting time may be two hours prior to the scheduled departure time, three hours prior to the scheduled departure time, six hours prior to the scheduled departure time, twelve hours prior to the scheduled departure time, twenty-four hours prior to the scheduled departure time, forty-eight hours prior to the scheduled departure time, etc. In yet still another example according yet still another embodiment, the duration of flight 15 extends from approximately a predetermined starting time leading up to the scheduled departure time of flight 15 to approximately the scheduled departure time of the flight, in which the starting time may be two hours prior to the scheduled departure time, three hours prior to the scheduled departure time, six hours prior to the scheduled departure time, twelve hours prior to the scheduled departure time, twenty-four hours prior to the scheduled departure time, forty-eight hours prior to the scheduled departure time, etc.

The accounts 55 maintained by computer system 11 are provided for the benefit of the passengers of flight 15, and may be provided not only with the address to a specific passenger individual subscriber unit 40, but also with any number of additional addresses to any number of another individual subscriber units assigned to other parties as may be desired the designate passenger, such as one or more family members, friends, colleagues, or other designated party or parties, whether or not each additional party is an assigned passenger of flight 15. In this regard, each passenger may provide the addresses to one or more additional individual subscriber units at the time of making his or her reservation for flight 15, or at a later time as may be desired, whereby the one or more additional address specified by the passenger are each maintained in the designated electronic account 55. In this permutation of the invention, each message issued from computer system 11 in conjunction with a particular account 55 maintaining a plurality of addresses to a corresponding plurality of individual subscriber units will be issued to all of the designated addresses maintained in the particular electronic account 55, thereby providing all corresponding individual subscriber units with updated flight information 14, in accordance with the principle of the invention. In this embodiment of the invention, a designated party assigned a particular individual subscriber unit may, in addition to the passenger, be kept aware of flight information 14 of flight 15. As a matter of example, the party to the other subscriber unit whose address is maintained in the account 55 in addition to the address to the individual subscriber unit 40 of the passenger may be the party to receive the passenger at the arrival destination, a friend or family member or colleague of the passenger wishing to keep informed of flight information 14, etc. In the case of the other party being the receiving party for the passenger at the arrival destination, the provision of keeping this receiving party apprised of flight information 14 through his or her individual subscriber unit ensures that the receiving party will arrive to collect the passenger at the arrival location at the appropriate time. It is to be understood that any number of addresses associated with a corresponding number of individual subscriber units may be incorporated into the account 55 relating to an assigned passenger of flight 15 without departing from the invention.

As disclosed herein, system 10 supplies messages containing updated flight information 14 about flight 15 to individual subscriber units 40 of passengers assigned to flight 15, and also to individual subscriber units of other parties as may be required or desired by the particular passenger. Each passenger account 55 may be created and activated in response to making a flight reservation or at the time a flight reservation is made, or at a later time or, if desired, with the use of a subscriber or login procedure, such as a telephone login procedure, a web-based login procedure, or the like.

As a matter of example, each passenger may be provided with a confirmation code or PIN number at the time of making a reservation for flight 15, which the passenger may use to establish an account 55. To establish an account with a confirmation code or PIN number, the passenger may simply pick up the telephone, dial a designated login number to architecture 50 or other telephonic system associated with computer system 11, key in or voice entry the confirmation code or PIN number, and then hang up the telephone. Such login systems are very well known and readily available and do not comprise part of the invention. The passenger information, including the address to the passenger's individual subscriber unit may be linked to or otherwise associated with the passenger's confirmation code or PIN number, whereby entry of the confirmation code or PIN number by the passenger in the telephone login procedure would simply function to cause computer system 11, according to its programming, to create and activate the passenger's account 55. The foregoing login procedure may, as an alternative, be carried out by the passenger through web site 51 according to any conventional, well-known, or readily-available website login procedure.

To establish an account 55 without a confirmation code or PIN number, the passenger may simply pick up the telephone, dial a designated login number to architecture 50 or other telephonic system associated with computer system 11, key in or voice entry requested information to set up an account, including any requested personal information and the address to the passenger's individual subscriber unit and also any requested flight information provided to the passenger in making a reservation for flight 15, whereby an account 55 is established. Such login systems are very well known and readily available and do not comprise part of the invention. The foregoing login procedure may, as an alternative, be carried out by the passenger through web site 51 according to any conventional, well-known, or readily-available website login procedure.

In sum, the flight reminder service provisions offered by system 10 may be activated and made available to a passenger in response to making a reservation for flight 15, or through a selected and readily-available login procedure with computer system 11 carried out either at the time of, or at the approximate time of, making a reservation for flight 15, or at a later time. Computer system 11 may be implemented and managed by airline 16, or, for instance, by a third party service provider, and a fee may be required for passengers to partake of the flight reminder provisions of the invention as disclosed herein.

Accounts 55 maintained by computer system 11 are preferably accessible online by the corresponding passengers through web site 51 utilizing a computer or other networked computer appliance communicating through wireless computer network 31 or other computer network or Internet. Accounts 55 may be accessed through a selected login procedure utilizing a login number or code, an email address, a name, or the like. The information contained in each account 55, including flight information 14, is displayed and presented in any desired manner or form suitable for communicating the information to the passenger.

Accounts 55 may be accessed by passengers of flight 15 at any time, whether through web site 51 or telephonically by calling in to architecture 50 from a telephone. After accessing an account 55, the passenger assigned thereto may input personal messages if desired, such as a reminder message to remind him not to forget to bring his laptop computer, to not forget to bring his wallet, to not forget to bring his medication, a message not to forget to send flowers to a family member or loved one, etc. Other messages for the benefit of the passenger may be input if desired, which are incorporated into the messages sent to the individual subscriber unit 40 of the passenger from computer system 11 through architecture 50, in accordance with the principle of the invention.

If an account 55 specifies an additional address to any additional individual subscriber unit to another party, the passenger may input a message into his account to the other party, which is communicated to the other party through the other individual subscriber unit in the next message issued from computer system 11. The message intended for an additional party whose individual subscriber unit address is incorporated into the subject account 55 can be any desired message, such as a simple greeting, a request, an emergency message intended to communicate an emergency such as a medical problem or a financial problem or other form of emergency, or other personal message. If an account 55 specifies a plurality of addresses to a corresponding plurality of individual subscriber units, it is preferred that all corresponding parties have access to the account 55 in the same manner, which allows each party to input messages into account 55 for inclusion in the flight information update messages sent by computer system 11 to the individual subscriber units through architecture 50. In this regard, each account 55 is, according to the principle of the invention, a conduit for passengers to send messages to themselves, for passengers to send messages to other parties, and for other parties to send messages to the passengers. Personal messages sent to the designated account 55 are each maintained in the account 55 by computer system 11, and are included in the flight reminder messages sent from computer system 11.

Those having regard for the art will readily appreciate that an exemplary flight information reminder system 10 has been disclosed, which includes computer 11 system maintaining updated flight information 14 about flight 14 having a duration, and which is adapted to issue messages to individual subscriber units 40 over a wireless network, such as wireless computer network 31 and/or wireless telephonic network 32, at spaced intervals throughout at least a portion of the duration of flight, whereby the messages each contain updated flight information 14 about flight 15. Consistent with the foregoing discussion, the flight information reminder method of the invention includes providing flight 15 having a duration, providing a passenger assigned to flight 15 and to individual subscriber unit 40, providing computer system 11 maintaining updated flight information 14 about flight 15, and which is adapted to issue messages to the individual subscriber unit 40 over a wireless network, such as wireless computer network 31 and/or wireless telephonic network 32, and computer system 11 issuing messages to the individual subscriber unit 40 over the wireless network at spaced intervals throughout at least a portion of the duration of flight, in which the messages each contain the updated flight information 14 about flight 15. In a particular embodiment, the method further specifies a personal message to the passenger maintained by computer system 11, and computer system 11 including the personal message in at least one of the messages. In yet another embodiment, the method additionally includes a personal message to the passenger from a third party maintained by computer system 11, and computer system 11 including the personal message from the third party in at least one of the messages. Of course, and consistent with the teachings specified in this specification, the method can be utilized in sending messages to a plurality of individual subscriber units.

Further summarizing the invention, the messages each consist of an automated voice message, a text message, an email message or other form of electronic message, and the updated flight information 14 consists of an updated departure time of the flight, an updated arrival time of the flight, an updated flight status, or other information relating to the flight including, as a matter of example, the name of the airline, the flight number, the flight departure location, the flight arrival destination, etc. The duration of flight 15 can extend from approximately an establishment of flight 15 to approximately a departure time of the flight 15, from approximately an establishment of flight 15 to approximately an arrival time of flight 15, from approximately a starting time leading up to a departure time of flight 15 to approximately the departure time of flight 15, from approximately a starting time leading up to a departure time of flight 15 to approximately an arrival time of flight 15, etc.

The flight reminder system and associated flight reminder methods disclosed herein reliably provide passengers and others with updated flight information and flight status about flights, and which keeps passengers and others informed of departing and arriving flights, in accordance with the principle of the invention. Keeping passenger of flights and others informed of the status of flights according to the invention reduces or eliminates unnecessary travel to and from airports by passengers, reduces needlessly-incurred parking fees and other travel fees relating to unnecessary or prolonged travel to and from airports, reduces unnecessary vehicle traffic at airports, reduces the number of telephone calls made to airline service providers requesting flight status information, helps develop goodwill and increased communication between airline service providers and passengers, and ensures that scheduled passengers are kept informed of their flight information and are not forgotten by airline service providers.

As previously stated, the flight reminder service provisions offered by system 10 may be activated and made available to a passenger in response to making a reservation for flight 15, or through a selected and readily-available subscriber or login procedure with computer system 11 carried out either at the time of, or at the approximate time of, making a reservation for flight 15, or at a later time, whereby computer system 11 may be implemented and managed by airline 16, or, for instance, by a third party service provider, in which a fee may be required for passengers to partake of the flight reminder provisions of the invention as disclosed herein. In subscribing to system 10, a passenger may subscribe himself to system 10, may subscribe one or more other persons or parties or passengers to system 10, and may subscribe to receive flight information in conjunction with a plurality of flights.

The invention has been described above with reference to a preferred embodiment. However, those skilled in the art will recognize that changes and modifications may be made to the embodiment without departing from the nature and scope of the invention. For instance, although the present invention has been discussed in conjunction with one airline, any number of airlines can be utilized in conjunction with the invention without departing from the present teachings. Furthermore, the various components of system 10 may be multiplied as needed depending on specific needs and the extent or coverage of the flight reminder service provisions of the invention.

Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A flight information reminder method comprising steps of:
   providing a computer system maintaining updated flight information about a flight having a duration, and adapted to issue messages to an individual subscriber unit over a wireless network; and
   the computer system issuing messages to the individual subscriber unit over the wireless network at spaced intervals throughout at least a portion of the duration of the flight, the messages each containing the updated flight information about the flight.

2. The flight information reminder method according to claim 1, wherein each of the messages comprises an automated voice message.

3. The flight information reminder method according to claim 1, wherein each of the messages comprises a text message.

4. The flight information reminder method according to claim 1, wherein each of the messages comprises an email message.

5. The flight information reminder method according to claim 1, wherein the updated flight information comprises an updated departure time of the flight.

6. The flight information reminder method according to claim 1, wherein the updated flight information comprises an updated arrival time of the flight.

7. The flight information reminder method according to claim 1, wherein the updated flight information comprises an updated flight status.

8. The flight information reminder method according to claim 1, wherein the duration of the flight extends from approximately an establishment of the flight to approximately a departure time of the flight.

9. The flight information reminder method according to claim 1, wherein the duration of the flight extends from approximately an establishment of the flight to approximately an arrival time of the flight.

10. The flight information reminder method according to claim 1, wherein the duration of the flight extends from approximately a starting time leading up to a departure time of the flight to one of approximately the departure time of flight and approximately an arrival time of the flight.

11. The flight information reminder method according to claim 1, wherein the wireless network comprises a wireless computer network.

12. The flight information reminder method according to claim 1, wherein the wireless network comprises a wireless telephonic network.

13. A flight information reminder method comprising steps of:
providing a flight having a duration;
providing a passenger assigned to the flight and to an individual subscriber unit;
providing a computer system maintaining updated flight information about the flight, and adapted to issue messages to the individual subscriber unit over a wireless network; and
the computer system issuing messages to the individual subscriber unit over the wireless network at spaced intervals throughout at least a portion of the duration of the flight, the messages each containing the updated flight information about the flight.

14. The flight information reminder method according to claim 13, further comprising:
a personal message to the passenger maintained by the computer system; and
the computer system including the personal message in at least one of the messages.

15. The flight information reminder method according to claim 13, further comprising:
a personal message to the passenger from a third party maintained by the computer system; and
the computer system including the personal message from the third party in at least one of the messages.

16. The flight information reminder method according to claim 13, wherein each of the messages comprises an automated voice message.

17. The flight information reminder method according to claim 13, wherein each of the messages comprises a text message.

18. The flight information reminder method according to claim 13, wherein each of the messages comprises an email message.

19. The flight information reminder method according to claim 13, wherein the updated flight information comprises an updated departure time of the flight.

20. The flight information reminder method according to claim 13, wherein the updated flight information comprises an updated arrival time of the flight.

21. The flight information reminder method according to claim 13, wherein the updated flight information comprises an updated flight status.

22. The flight information reminder method according to claim 13, wherein the duration of the flight extends from approximately an establishment of the flight to approximately a departure time of the flight.

23. The flight information reminder method according to claim 13, wherein the duration of the flight extends from approximately an establishment of the flight to approximately an arrival time of the flight.

24. The flight information reminder method according to claim 13, wherein the duration of the flight extends from approximately a starting time leading up to a departure time of the flight to one of approximately the departure time of flight and approximately an arrival time of the flight.

25. The flight information reminder method according to claim 13, wherein the wireless network comprises a wireless computer network.

26. The flight information reminder method according to claim 13, wherein the wireless network comprises a wireless telephonic network.

* * * * *